United States Patent
Ozaki et al.

(10) Patent No.: US 6,172,829 B1
(45) Date of Patent: Jan. 9, 2001

(54) DIGITAL AUDIO TAPE RECORDING/REPRODUCING APPARATUS FOR USE WITH MULTIPLE FORMATS

(75) Inventors: Shinya Ozaki, Kanagawa; Tatsuya Iijima, Tokyo; Masaki Yamada, Kanagawa, all of (JP)

(73) Assignee: Sony Corporation, Tokyo (JP)

( * ) Notice: Under 35 U.S.C. 154(b), the term of this patent shall be extended for 0 days.

(21) Appl. No.: 09/153,801

(22) Filed: Sep. 15, 1998

(30) Foreign Application Priority Data

Sep. 17, 1997 (JP) .................................................. 9-252384
Nov. 21, 1997 (JP) .................................................. 9-321755

(51) Int. Cl.⁷ ....................................................... G11B 5/09
(52) U.S. Cl. ............................... 360/48; 360/53; 360/69; 360/60
(58) Field of Search .............................. 360/48, 53, 69, 360/61, 60, 64

(56) References Cited

U.S. PATENT DOCUMENTS 3,947,876   3/1976  Gray .
5,559,644 * 9/1996  Ozaki et al. ............................ 360/48
5,828,507 * 10/1998 Yamada et al. ...................... 360/53 X
5,896,067 * 4/1999  Williams .............................. 360/51 X

FOREIGN PATENT DOCUMENTS 0570202   11/1993  (EP) .
2080997   2/1982   (GB) .
9516985   6/1995   (WO) .

OTHER PUBLICATIONS

"The Art of Data Recording" by Watkinson, pp 342, 343, Dec. 1994.*

* cited by examiner

Primary Examiner—Alan T. Faber
(74) Attorney, Agent, or Firm—Jay H. Maioli

(57) ABSTRACT

A data recording and reproducing apparatus for recording and reproducing data on azimuth tracks of a magnetic tape in which the data may be audio data or computer data in any of several different computer data formats includes a controller that controls the recording and reproducing signal processing so as to be responsive to the four different kinds of data formats such that main data and subdata may be separated from the audio data and subcodes and error correction codes generated and appended to the data stream as required.

29 Claims, 8 Drawing Sheets

DIGITAL AUDIO TAPE RECORDING/ REPRODUCING APPARATUS FOR USE WITH MULTIPLE FORMATS

BACKGROUND OF THE INVENTION

1. Field of the invention

This invention relates to a data recording method and apparatus for recording digital audio data or computer data on, a tape-shaped recording medium and to a data reproducing method and apparatus for reproducing digital audio data or computer data from a tape-shaped recording medium.

2. Description of the Related Art

There has so far been known a digital audio tape recorder (DAT) for recording digital audio signals on a recording track inclined relative to the running direction of a magnetic tape by a rotary head for the purpose of reducing the length of the magnetic tape required for recording.

Since the DAT can reduce consumption of the magnetic tape and elevate the data rate during recording, it is preferentially used in a tape recorder, known as a data streamer, used for protecting computer data written on a hard disc.

When using the DAT as a tape recorder, data from the host computer is converted into a DAT format data prior to recording.

In the DAT format, a frame is completed by two inclined tracks formed during one complete revolution of two heads having different azimuth angles, and 16-bit PCM audio signals are interleaved and recorded on the frame basis. Each track is made up of 196 blocks, each block being formed by 36 bytes. This track is roughly divided into seven areas, as shown in FIG. 1.

Both end marginal areas M are spare areas for realizing stable contact between the tape and the head. Two sub-data areas are those used for recording subcodes which are a variety of signals, such as time or addresses. Two automatic track finding (ATF) areas are those areas for recording the ATF signals and for achieving automatic track finding via the recording head. A main area D is an area for recording main audio data. In this main area D are recorded the main audio data, error correcting parity and part of the subcodes ancillary to the audio data. The main area D is made up of 128 blocks, each being formed by 36 bytes.

Each of 128 blocks of the main area D has synchronization signals, PCM-IDs, block addresses and a parity, each of one byte, beginning from the leading end of the block. In the next following 32-byte area is arranged main data.

If the data is audio signals, the main data is 16-bit PCM data of the left channel (L) and the right channel (R). This 16-bit main data is interleaved and arranged in the main area of two tracks, that is one frame, along with the parity Q. In this case, approximately 5760 bytes of data are recorded in the main area of one frame.

Since each track is divided in the DAT format into a main area and a sub-area, after-recording can be made using the sub-area.

The structure of the error correction code of main data in the DAT format is the two-dimensional code, as shown in FIG. 3, with the code planes being, four planes per track, each being coded in C1 and C2 directions.

If the DAT is used as a data recorder, data sent from the host computer is 16-bit data handled in the same manner as the above-mentioned PCM data. These data are formatted and recorded in the one-frame main area. In this case, data of the two bytes and 16 bits corresponding to L and R channels are used, and upper four bits thereof are used as format ID, while the lower eight bits are recorded as logical frame numbers. The format ID specifies a format proper to the data recorder. The logical frame number has 23 frames, for example, as a unit, and frame numbers of 1 to 23 are attached on the unit basis.

With the data recorder, employing such DAT, a higher transfer rate and a larger capacity have recently been realized in keeping up with the progress in the format. The data recorder format is prescribed by, for example, the standard of the European Computer manufacturers Association (ECMA). Recently, the recording density is improved by narrowing the track pitch or changing the recording format, such that a data recorder of the third generation has now been prescribed.

The data recorders of the first, second and third generations are termed a DDS (digital data streamer), DDS2 and DDS3, respectively.

Meanwhile, audio data for DAT cannot be recorded at present in a tape cassette for DDS2 nor in a tape cassette for DDS3.

The above-mentioned DDS2 and DDS3 have been utilized as a data recorder for computers, and are not inherently required to have the function of recording or reproducing audio data for DAT. However, if the user in possession of the DDS2 or DDS3 desires to record or reproduce audio data for DAT, it is inconvenient if he or she is compelled to purchase a dedicated recording/reproducing apparatus.

SUMMARY OF THE INVENTION

It is therefore an object of the present invention to provide a data recording method and apparatus inherently operating as a data recorder and which nevertheless can record audio data for DAT.

It is another object of the present invention to provide a data reproducing method and apparatus for reproducing not only computer data but audio data for DAT.

In one aspect, the present invention provides a data recording apparatus including recording system signal processing means for performing recording system signal processing on the audio data- or computer data entered via the interface controller, and control means for controlling the recording system signal processing means responsive to four sorts of data format, namely a format for the audio data, a first computer data format comprised of the audio data format added to with error correction provisions in each track width direction in terms of a defined number of tracks, a second computer data format having a track pitch prescribed to be narrower in track pitch than the first computer data format and a third computer data format having a line recording density higher than in the second computer data format.

The recording system signal processing means preferably includes separation means for separating main and sub-data of the audio data, subcode generating means for generating sub-codes of the computer data, index appendage means for appending the index information to the computer data, C3 encoding means for appending the C3 error correction code to a data string in the track width direction in terms of a defined number of tracks of the computer data having the appended index information, interleaving means for interleaving computer data having an appended C3 error correction code and separated audio main data, C2 encoding means for appending the C2 error correction code to a data string in the track direction of the deinterleaved computer data or audio main data, subcode appendage means for appending the separated audio sub-code to the audio main data and for appending the sub-code of the computer data to the computer data, C1 encoding means for appending the C1 error correction code to each defined block unit of audio main data having appended audio sub-codes and computer data having appended computer data subcodes, block-forming means for blocking the audio data or computer data having appended C1 error correction code and for appending the subcodes for the computer data from the subcode appendage means to the computer main data from the C1 encoding means and for blocking the resulting data, modulating means for modulating the blocked audio data or computer data and synchronization signal appendage means for appending the synchronization signals to a modulated output of the modulation means.

The subcode generating means preferably executes first subcode generating processing or second subcode generating processing if the input computer data is the first or second computer data format or if the input computer data is the third computer data format, respectively.

The C3 encoding means preferably executes first C3 encoding or second C3 encoding if the input computer data is of the first or second computer data format or if the the input computer data is of the third computer data format, respectively.

The interleaving means preferably executes first interleaving or second interleaving if the input data is of the audio format, first computer data format or the second computer data format or if the input data is of the third computer data format, respectively.

The C2 encoding means preferably executes first C2 encoding or second C2 processing if the input data is data of the audio format, first computer data format or the second computer data format processed with the first interleaving, or if the input data is data of the third computer data format processed with the second interleaving.

The C1 encoding means preferably executes first C1 encoding or second C1 processing if the input data is data of the audio format, first computer data format or the second computer data format processed with the first C2 encoding, or if the input data is data of the third computer data format processed with the second C2 encoding.

The subcode appendage means preferably executes first subcode appendage or second subcode appendage if the input data is the subcode of data of the audio format from the separation means, or if the input data is subcode of the third computer data format from the subcode generating means, respectively.

The block forming means preferably executes first blocking or second blocking if the input data is data of the audio data format, first computer data format or the second computer data format processed with the first C1 encoding or if the input data is data of the third computer data format processed with the second C1 encoding.

The modulation means preferably executes first modulation or second modulation if input data is data of the audio data format, first computer data format or the second computer data format or if the input data is data of the third computer data format, respectively.

The control means preferably controls the means of the recording system signal processing means depending on a mode designation command of audio or computer data supplied from outside via an interface controller and on the type of a tape-shaped recording medium loaded on recording means provided with a rotary head and which is adapted to record data on the magnetic tape.

The control means preferably records the audio data on the tape-shaped recording medium if the audio mode is specified by the mode designating command from outside and if the type of the tape-shaped recording medium is for the second computer data format.

The control means preferably advises the user that audio data cannot be recorded on the tape-shaped recording medium if the audio mode is specified by the mode designating command from outside and if the type of the tape-shaped recording medium is for the third computer data format.

The control means preferably causes the data of the audio format to be recorded on the tape-shaped recording medium subject to a second command from the user if the audio mode is specified by the mode designating command from the user and if the type of the tape-shaped recording medium is for the second or third computer data format.

In another aspect, the present invention provides a data recording method including inputting the audio data or computer data via an interface controller, controlling the recording system signal processing responsive to four sorts of data format, namely a format for the audio data, a first computer data format comprised of the audio data format with error correction provisions in the track width direction in terms of a defined number of tracks as a unit, a second computer data format having a track pitch prescribed to be narrower in track pitch than the first computer data format and a third computer data format having a line recording density higher than in the second computer data format, and recording the audio data or the computer data processed with the recording system signal processing on the magnetic tape.

In still another aspect, the present invention provides a data reproducing apparatus including reproducing means for reading out the audio data or the computer data recorded on the magnetic tape using a rotary head, reproducing system signal processing means for processing the read-out data with reproducing system signal processing, and control means for controlling the reproducing system signal processing means in accordance with four sorts of data format, namely a format for the audio data, a first computer data format comprised of the audio data format added to with error correction provisions in each track width direction in terms of a defined number of tracks, a second computer data format having a track pitch prescribed to be narrower than that of the first computer data format and a third computer data format having a line recording density higher than in the second computer data format.

The reproducing system signal processing means preferably includes synchronization signal detection means for detecting synchronization signals from data read out from the reproducing means, demodulating means for demodulating the audio or computer data using detected synchronization signals, C1 decoding means for processing the demodulated audio or computer data with C1 error correction using the C1 error correction code, C2 decoding means for processing the audio or computer data from the C1 decoding means with C2 error correction using the C2 error correction code, deinterleaving means for deinterleaving the audio or computer data from the C2 decoding means, C3 decoding means for processing the deinterleaved computer data with C3 error correction and subcode decoding means for decoding the subcodes from the audio or computer data from the C1 decoding means and computer data from the demodulating means.

The demodulating means preferably processes input data with first demodulation or with second demodulation if input data is data of the audio format, first computer data format or the second computer data format or if the input data is data of the third computer data format.

The C1 decoding means preferably processes input data with first C1 decoding or with second C1 decoding if input data is data of the audio format, first computer data format or the second computer data format processed with the first demodulation or if the input data is data of the third computer data format processed with the second demodulation.

The C2 decoding means preferably processes input data with first C2 decoding or with second C2 decoding if input data is data of the audio format, first computer data format or the second computer data format processed with the first C1 decoding or if the input data is data of the third computer data format processed with the second C1 decoding.

The deinterleaving means preferably processes input data with first deinterleaving or with second deinterleaving if input data is data of the audio format, first computer data format or the second computer data format processed with the first C2 decoding or if the input data is data of the third computer data format processed with the second C2 decoding.

The C3 decoding means preferably processes input data with first C3 decoding or with second C3 decoding if input data is data of first computer data format or the second computer data format processed with the first deinterleaving or if the input data is data of the third computer data format processed with the second deinterleaving.

The subcode decoding means preferably processes input data with first subcode decoding, second subcode decoding or with third subcode decoding if input data is data of audio format, if the input data is data of the first computer data format or the second computer data format or if the input data is data of the third computer data format, respectively.

The control means preferably controls the reproducing system signal processing means depending on a mode designating command of audio or computer data supplied from outside via interface controller and on the format of data recorded on the tape-shaped recording medium loaded on the reproducing means.

If the audio mode is designated from outside and the format of data recorded on the tape-shaped recording medium is the audio format, the control means causes the data of the audio format to be reproduced from the tape-shaped recording medium. If the audio mode is designated from outside, but if the format of data recorded on the tape-shaped recording medium is the computer data format, the control means advises to outside that the computer data cannot be reproduced.

In yet another aspect, the present invention provides a data reproducing method including reproducing the audio data or the computer data recorded on the magnetic tape by reproducing means, controlling reproducing system signal processing for reproduced data in accordance with four sorts of data format, namely a format for the audio data, a first computer data format comprised of the audio data format added to with error correction provisions in each track width direction in terms of a defined number of tracks, a second computer data format having a track pitch prescribed to be narrower than that of the first computer data format and a third computer data format having a line recording density higher than in the second computer data format.

The data recording apparatus of the present invention, inherently operating as a data recorder for recording data for DDS, DDS2 and DDS3, can also record audio data for DAT.

The recording method according to the present invention records can record not only data for DDS, DDS2 and DDS3 but also audio data for DAT on an azimuth track of a magnetic tape using a recording device having a rotary head.

The data reproducing apparatus can reproduce not only computer data for DDS, DDS2 and DDS3, but also audio data for DAT.

In addition, the data reproducing method according to the present invention can reproduce not only DDS, DDS2 or DDS3 data but also audio data for DAT from an azimuth track on the magnetic tape using a reproducing apparatus having a rotary head.

DESCRIPTION OF THE PREFERRED EMBODIMENTS

Figure 1:
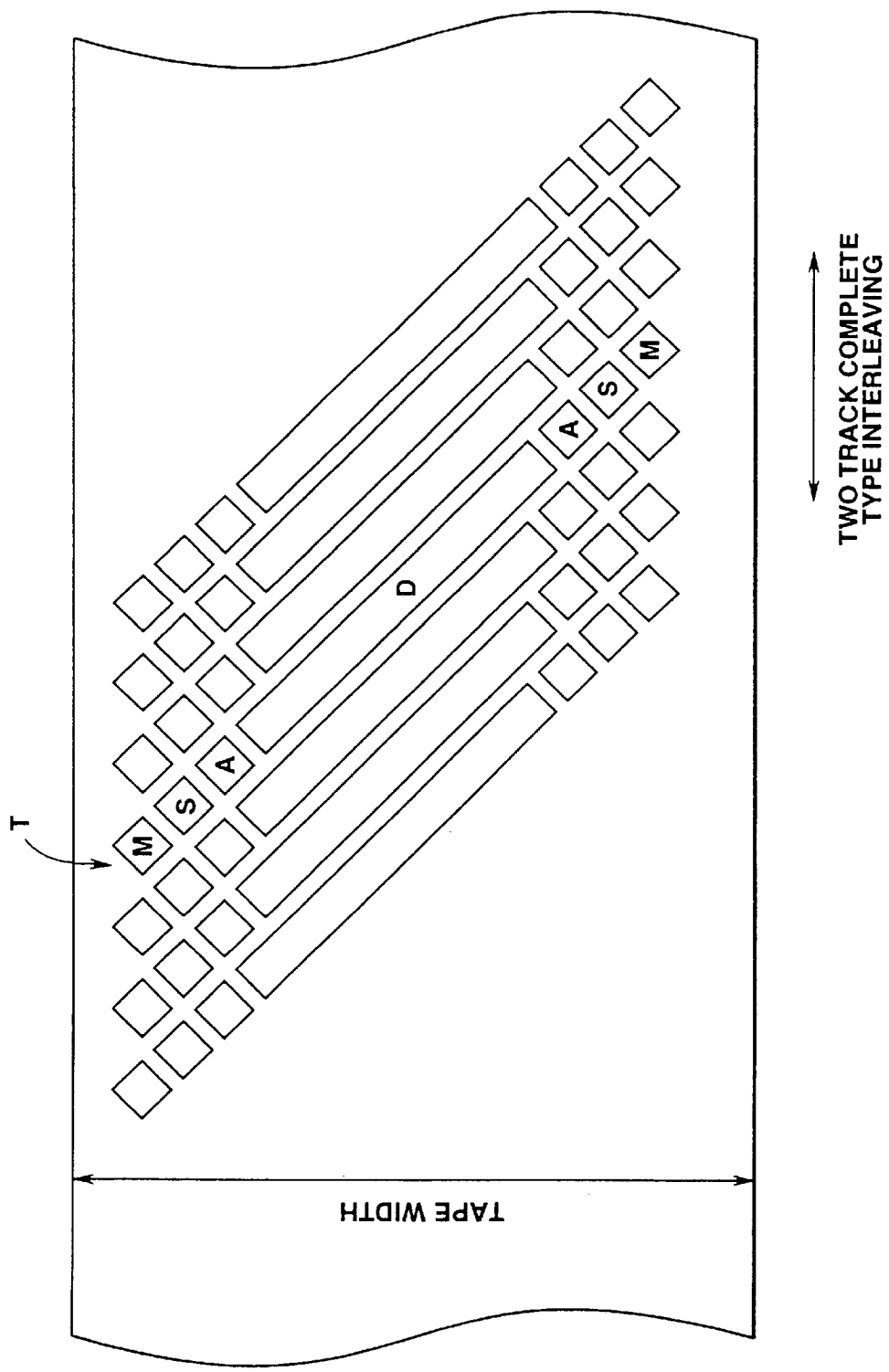
FIG. 1 shows a track format in the DAT format.
Figure 2:
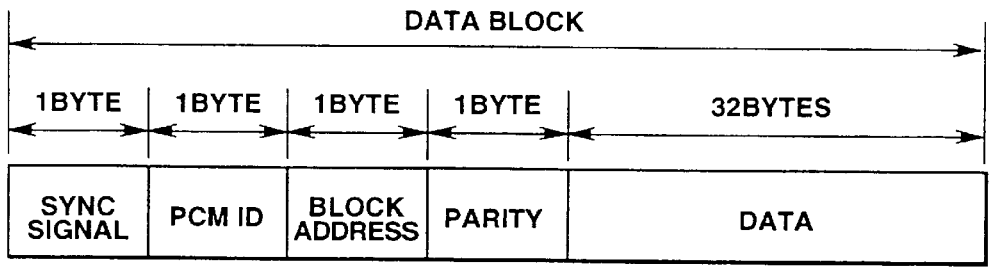
FIG. 2 shows a block format of main data in the DAT format.
Figure 3:
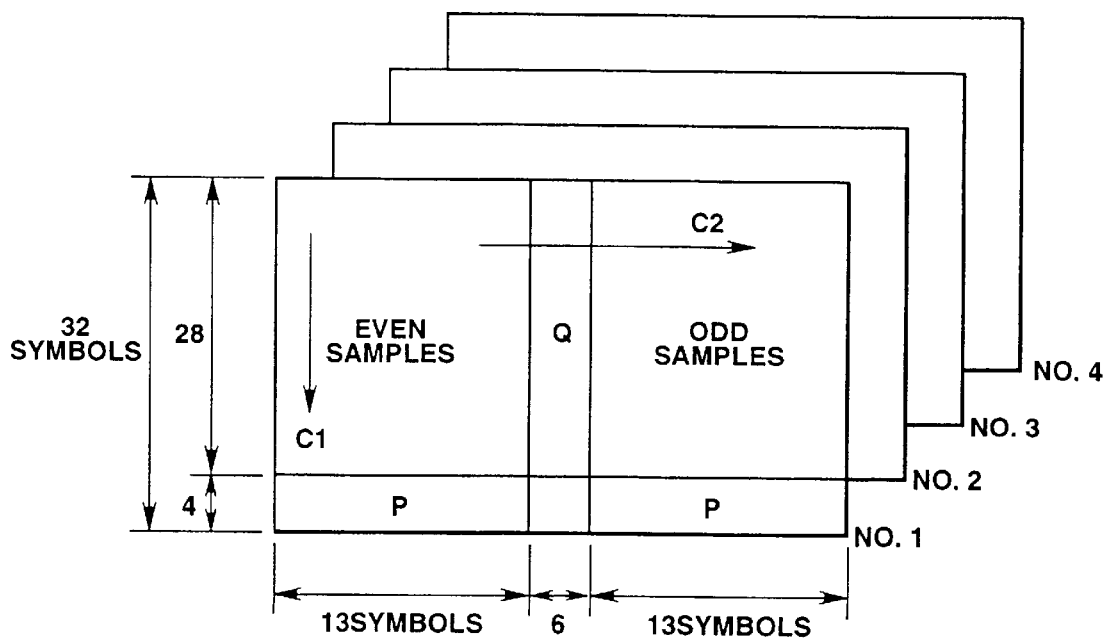
FIG. 3 shows the structure of an error correction code of main data in the DAT format.

Referring to the drawings, preferred embodiments of a data recording method and device and a data reproducing method and device according to the present invention will be explained in detail. These embodiments are directed to a data streamer adapted for recording audio data or computer data on azimuth tracks on a magnetic tape by a rotary head and for reproducing the recording audio data or computer data from the magnetic tape. The data recording method and the data recording device are implemented by this data streamer.

Figure 4:
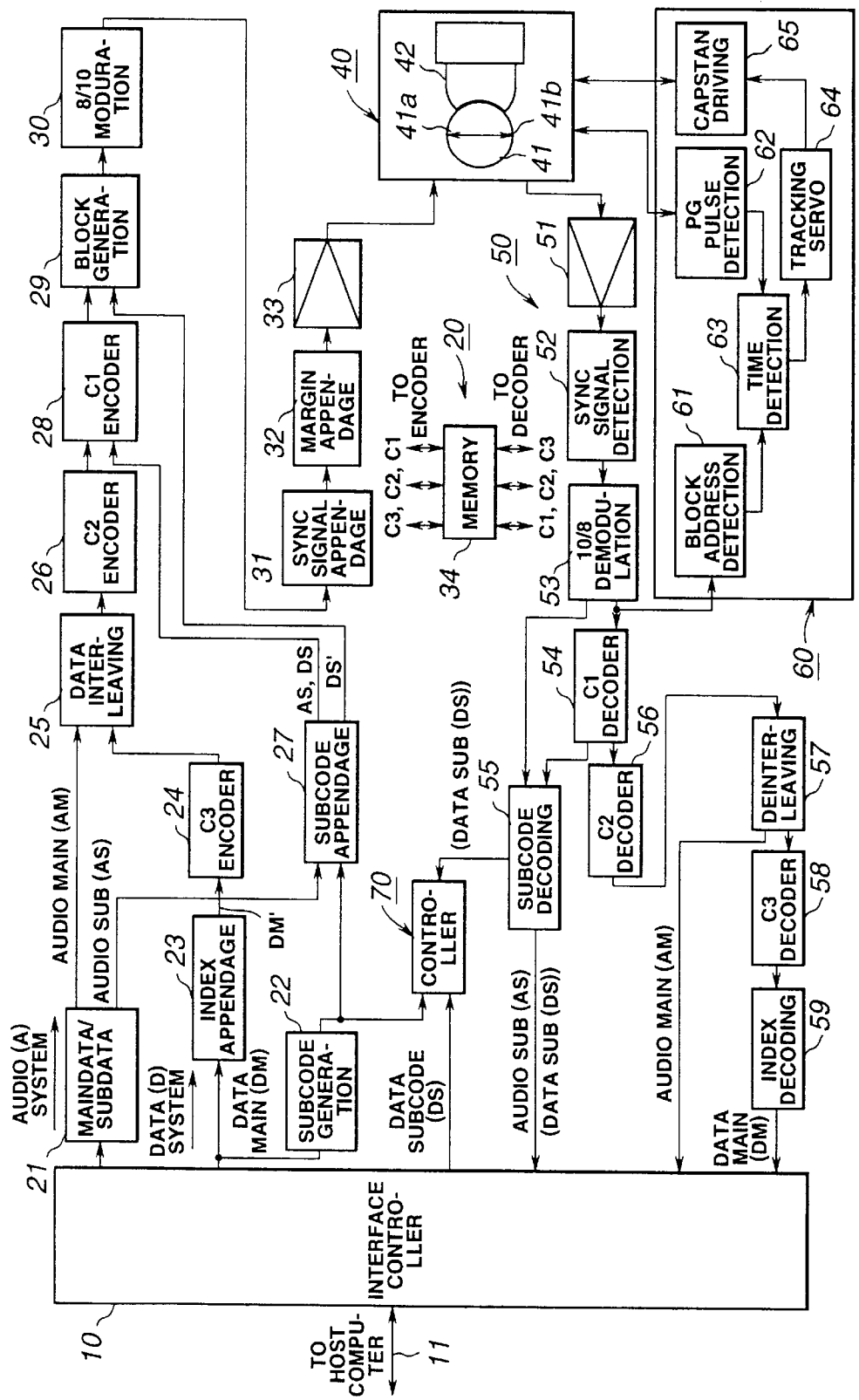
FIG. 4 is a block diagram of a data streamer embodying the present invention.

The data streamer embodying the present invention, shown in FIG. 4, includes an interface controller 10, for controlling the input/output of data from e.g., a small computer interface (SCSI), adapted for exchanging data with an external equipment, such as a host computer, and a recording system signal processor 20 for processing input data from the interface controller 10 for converting the data into signals of a defined format. The data streamer also includes a recording/reproducing unit 40 for recording signals supplied from the recording system signal processor 20 on the azimuth tracks on the recording tape 42 by paired rotary magnetic heads 41a, 41b and for reproducing the signals recorded on the azimuth tracks by the rotary magnetic heads 41a, 41b, and a reproducing system signal processor 50 for processing reproduced signals from the recording/reproducing unit 40 to reproduce original signals. The data streamer further includes a tracking controller 60 for controlling the tape running system of the recording/reproducing unit 40 and a controller 70 for controlling the above respective components.

This data streamer functionally accepts loading (insertion) into the recording/reproducing unit 40 of the tape cassette for the DAT, in addition to the tape cassette of the first generation DDS, prescribed by the ECMA standard, the tape cassette of the second generation DDS2 and the tape cassette of the third generation DDS3.

If the data mode for the computer data is selected, the, data streamer records/reproduces data by the formats of the respective generations conforming to the types of the inserted tape cassettes. If the audio mode is selected, and the tape cassette for DAT is inserted, the data streamer records/reproduces the audio data.

During recording, when the audio mode is selected and nevertheless the tape cassette for the DDS2 is inserted, audio data for DAT is directly recorded. If the audio mode is selected and nevertheless the tape cassette for the DDS3 is inserted, the external computer is advised of the effect that recording cannot be made.

During reproduction, when the audio mode is selected, and nevertheless the tape cassette for the DDS2 or the tape cassette for the DDS3 is inserted, the audio data is reproduced only if the format of data recorded on the tape cassette is the audio format. If the data format is the computer data format, the external computer is advised of the effect that recording cannot be made.

In the following, the formats of the data streamers DDS, DDS2 and DDS3 for recording/reproducing computer data are abbreviated to D1, D2 and D3, respectively, while the DAT format is depicted as A.

The data streamer records/reproduces data of the four formats A, D1, D2 and D3, that is audio data, computer D1 data, computer D2 data and computer D3 data. These four formats are as shown in Table 1 below.

TABLE 1

| format | A | D1 | D2 | D3 |
|---|---|---|---|---|
| capacity (GB) | 120 min | 1.3/2 | 4 | 12 |
| tape length (m) | 60 | 60/90 | 120 | 120 |
| track pitch (μm) | 13.6 | 13.6 | 9.1 | 9.1 |
| line recording density (KBPI) | 61 | 61 | 61 | 122 |
| modulation system | 8/10 | ← | ← | new 8/10 |
| ECC | | | | |
| C1 | (32, 28, 5) | ← | ← | (62, 56, 7) |
| C2 | (32, 26, 7) | ← | ← | ← |
| C3 | — | (46, 43, 3) | ← | ← |
| interleaving | | | | |
| data | DAT system | ← | ← | new |
| C1 | 2 symbols | ← | ← | ← |
| C2 | 4 blocks | ← | ← | 3 blocks |
| C3 | — | 1 track | ← | ← |
| block length | 36 bytes | ← | ← | 133 bytes |
| track | 196 blocks | ← | ← | 96 blocks |
| group | — | 46 tracks | ← | ← |

The format A is the format for recording audio data, with the tape capacity being 120 minutes and the tape length being 60 m. The track pitch is 13.6 μm, with the line recording density being 61 KBPI. The modulation system is 8/10 modulation, with the error correction codes being C1 and C2. The interleaving system for data is the DAT system. The C1 and C2 codes are interleaved every two symbols and every four symbols, respectively. As for the data structure, each track is constituted by 196 blocks, each block being of 36 bytes.

In the format D1, the recording capacity is 1.3/2 Gbyte (GB), with the tape length being 60/90 m. The track pitch, line recording density and the modulation system are the same as those of the format A. As for the ECC, an error correction code C3 is appended in the track width direction every pre-set number of tracks, for example, every 46 tracks, in addition to the above-mentioned C1 and C2. The interleaving is every other track for C3. Each track is formed by 196 blocks, each block being of 36 bytes. In this manner, the format D1 is basically the format A changed so as to be usable for data. Therefore, audio data can be recorded on a tape cassette for D1.

On the other hand, in the format D2, the tape length is increased to 120 m, while the track pitch is reduced to 9.1 μm. The line recording density, modulation system, ECC, interleaving, block length, track structure and groove formation are similar to those of the above-mentioned format D1. However, the recording capacity can be substantially doubled by technical improvement in the tape length and track pitch.

In the format D3, the recording capacity can be substantially trebled to 12 GB by improving the track format as later explained, in addition to doubling the line recording density to 122 kBPI, despite the fact that the tape length and the track pitch are the same as those of the format D2. The modulation system used is the new 8/10 modulation system, while the ECC and interleaving are also be changed slightly. It is the track format that has been changed significantly. That is, each track is made up of 96 blocks, each block being of 133 bytes.

In the data streamer, shown in FIG. 4, the recording system signal processor 20 and so forth are controlled by the controller 70 for absorbing the differences in the four formats shown in table 1. Meanwhile, in FIG. 4, control lines for controlling various parts of the recording system signal processor 20 and the reproducing system signal processor 50 by the controller 70 are not shown.

The recording system signal processor 20 includes a separation circuit 21 for separating audio (A) data sent from the host computer via interface controller into audio main (AM) data and audio sub(AS) data, and a subcode generating circuit 22 for generating data sub (DS) codes from the computer data main (DM) sent in similar manner. The recording system signal processor 20 also includes an index appendage circuit 23 for appending the index information to the computer data main DM and a C3 encoder 24 for appending an error correction code C3 to the data main DM' from the index appendage circuit 23. The recording system signal processor 20 also includes an interleaving circuit 25 for interleaving the data main from the C3 encoder 24 and the audio main AM from the separation circuit 21, and a C2 encoder 26 for appending the error correction code C2 to an interleaved output of the interleaving circuit 25. The recording system signal processor 20 also includes a C1 encoder 28 for appending the error correction code C1 to the computer data system of the encoded output of the C2 encoder 26 and for appending C1 to the audio data system using the subcode from a subcode appendage circuit 27 and a block generating circuit 29 for blocking an audio system of the encoded output of the C1 encoder 28 and for blocking the data system using the subcode from the subcode appendage circuit 27. The recording system signal processor 20 also includes an 8/10 modulating circuit 30 for 8/10 modulating a block data output of the block generating circuit 29 to generate 10-bit data and a synchronization signal appendage circuit 31 for appending synchronization signals to 10-bit data from the 8/10 modulation circuit 30. The recording system signal processor 20 further includes a margin appendage circuit 32 for appending the margin to man data to which has been appended the synchronization signal by the synchronization signal appendage circuit 31 and an amplifier 33 for amplifying data to which the margin has been added by the margin appendage circuit 32.

The C3 encoder 24, C2 encoder 26 and the C1 encoder 28 make up an error correction code generator in cooperation with the memory 34. In this error correction code generator, the memory 34 stores main data to which has been appended the index information by the index appendage circuit 23. The C3 encoder 24 generates the error correction code C3 of a data string in the track width direction to append the code C3 to the data string in terms of 46 tracks as a unit. The C2 encoder generates an error correction code C2 of a data string in the track direction and splits the code C2 into two portions which are allocated to both end portions of the main data area of each track. The C1 encoder 28 generates the block-based error correction code C1.

The separation circuit 21 separates various subcodes S for time, addresses or the like, making up the audio data, as shown in FIG. 1, as the data subcode DS, from the audio main AM of the main area.

The subcode generating circuit 22 generates separator counters, as the division information specifying the divisions of computer data, and record counts, specifying the number of records. The subcode generating circuit 22 also automatically generates area IDs specifying various areas defined on the tape format, frame numbers, group counts specifying the number of record units, and the check sum, along with the block addresses. The subcode generating circuit 22 also generates the hysteresis information (system log).

The block generating circuit 29 collects the audio data and the computer data in terms of 36 or 133 bytes as a unit to produce blocks. At this time, two-byte parity for error detection is added to the subcodes appended to main data.

The 8/10 modulation circuit 30 converts the blocked data from 8 bits to 10 bits on the byte basis. The synchronization signal appendage circuit 31 appends the synchronization signals on the block basis to data converted by the 8/10 modulation circuit 30 into 10-bit data.

The margin appendage circuit 32 appends margins on the track basis to the data having appended synchronization signals. The data having the margins appended thereto on the track basis by the margin appendage circuit 32 are sent via amplifier 33 to the recording/reproducing unit 40.

The recording/reproducing unit 40 has a rotary drum 41 carrying paired rotary magnetic heads 41a, 41b adapted for providing a track pitch of, for example, 9.1 μm, in order to permit the magnetic tape 42 to be run at a defined running speed, with the magnetic tape 42 being wrapped around the rotary drum 41 over an angular extent of approximately 90°. The rotary magnetic heads 41a, 41b scan the two azimuth tracks on the magnetic tape 42 per each complete revolution of the rotary drum 41 to record/reproduce signals.

In the present embodiment of the data streamer, the reproducing system signal processor 50 includes an amplifier 51 for amplifying signals reproduced from the azimuth tracks of the magnetic tape 42 by the recording/reproducing unit 40, and a synchronization signal detection circuit 52 for detecting the synchronization signals from the reproduced signals amplified by the amplifier 51 to output resulting bi-level playback signals. The reproducing system signal processor 50 also includes a 10/8 demodulation circuit 53 for 10/8 demodulating the bi-level playback data from the synchronization signal detection circuit 52, and a C1 decoder 54 for decoding the D3 subcode from the 10/8 demodulation circuit 53 and for correcting the block data for errors using the error correction code C1 appended to each block. The reproducing system signal processor 50 also includes a subcode decoding circuit 55 for decoding the subcodes from the audio A or D1 and D2 data from the C1 decoder 54 and the 10/8 demodulation circuit 53, and a C2 decoder 56 for correcting the data string in the track direction for errors using the error correction code C2 for each unit data corrected for errors by the C1 decoder 54. The reproducing system signal processor 50 also includes a deinterleaving circuit 57 for deinterleaving data corrected for errors by the C2 decoder 56 in order to supply the audio main AM both to the interface controller 10 and to a C3 decoder 58, the C3 decoder 58 for error-correcting the data string of the deinterleaved data from the deinterleaving circuit 57 in terms of 46 tracks as a unit, and an index decoding circuit 59 for decoding the index information appended to a decoded output from the C3 decoder 58 to route the data main DM to the interface controller 10.

The synchronization signal detection circuit 52 detects synchronization signals from the playback signals supplied from the recording/reproducing unit 40 via amplifier 51 to convert the playback signals into bi-level signals by clocks synchronized with the synchronization signals to generate playback data.

The 10/8 demodulation circuit 53 converts 10-bit playback data from the in synchronization signal detection circuit 52 into corresponding 8-bit data by way of performing 10/8 demodulation in association with the operation executed by the 8/10 modulation circuit 30 of the recording system signal processor 20.

The C1 decoder 54, C2 decoder 56 and the C3 decoder 58 constitute an error correction processor in cooperation with the memory 34. In this error correction processor, the memory 34 transiently stores data having the appended index information with the above-mentioned 46 track or 23 frame data as a unit. This memory 34 is used in common with the error correction generator of the recording system signal processor 20.

The C1 decoder 54 corrects the main data of each block stored in the memory 34 using the error correction code C1 appended on the block basis. The C2 decoder 56 also error-corrects the data string in the track direction of the data corrected for errors by the C1 decoder 54, using the error correction code C2 appended to both end portions of the main data area of each track. The C3 decoder 58 also error-corrects the data string in the track width direction of the main data, error-corrected by the C2 decoder 56, using the error correction code C3 allocated to the above-mentioned 46 tracks as unit.

The index decoding circuit 59 decodes the index information, appended to the data corrected for errors by the error correction processor, and routes the data main DM via interface controller 10 to the host computer based on the index information.

The tracking controller 60 in the present embodiment of the data streamer includes a block address detection circuit 61 fed with block addresses from the reproducing system signal processor 50 via the 10/8 demodulation circuit 53, a PG pulse detection circuit 62 fed with the PG pulses from the recording/reproducing unit 40, a time detection circuit 63 fed with detection outputs of the block address detection circuit 61 and the PG pulse detection circuit 62, a tracking servo circuit 64 fed with a detection output of the tracking servo circuit 64 and a capstan driving circuit 65 fed with an output of the tracking servo circuit 64.

In the tracking controller 60 the block address detection circuit 61 detects the correct block address from the 10/8 demodulation circuit 53 to send a detection output specifying its detection timing to the time detection circuit 63. The time detection circuit 63 detects the time between the timing the block address detection circuit 61 has detected a defined block address and the timing the PG pulse detection circuit 62 has detected the PG pulse. It is noted that the time detected by the time detection circuit 63 is changed from the time in the just-tracking state depending on the tracking error.

The tracking servo circuit 64 detects the time difference between the reference time under the just-tracking state and the time as detected by the time detection circuit 63, that is the tracking error, in order to control the capstan driving circuit 65, adapted for driving the tape running system of the recording/reproducing 40, and in order to reduce the tracking error to zero based on the detection output.

The controller 70 controls the operation of the recording system signal processor 20, recording/reproducing unit 40 and the reproducing system signal processor 50 based on the command supplied from the host computer via interface controller 10.

In particular, when controlling the recording system signal processor 20, the controller 70 refers to the data subcode from the subcode generating circuit 22. When controlling the reproducing system signal processor 50, the controller 70 refers to the data sub DS from the subcode decoding circuit 55.

The above-mentioned recording system signal processor 20, recording/reproducing unit 40, tracking controller 60 and the controller 70 can make up a specified embodiment of the data recording apparatus according to the present invention.

Figure 5:
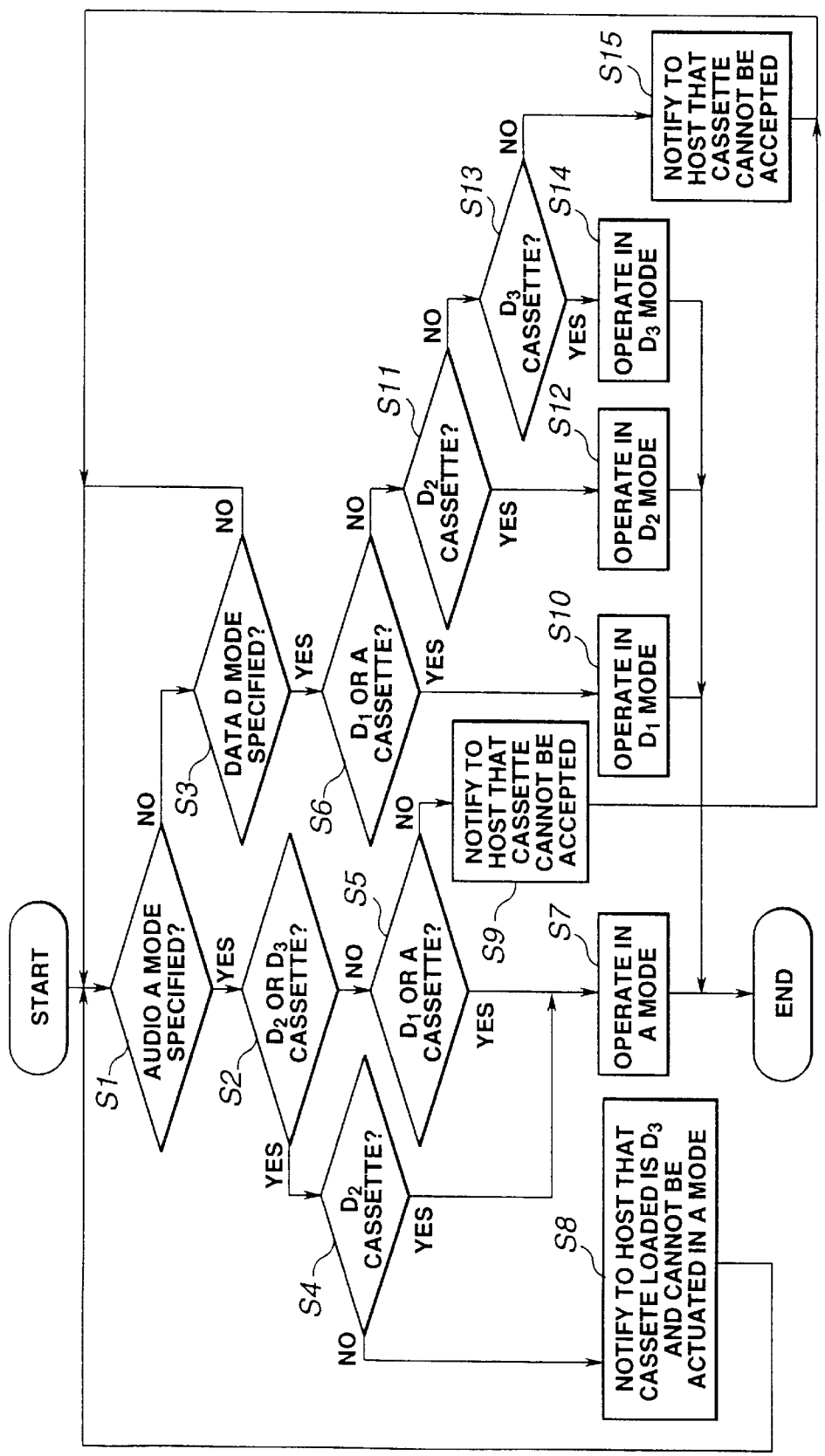
FIG. 5 is a flowchart for illustrating the operation of a specified example of a data recording apparatus constituting the data streamer.

The present specified embodiment records the audio data or the computer data in accordance with the flowchart shown in FIG. 5. First, at step S1, the controller 70 checks whether or not a command specifying the audio A mode has been sent from the host computer. If the controller 70 verifies that the A mode has been specified, the program shifts to step S2 and, if otherwise, the program shifts to step S3. Meanwhile, the present data streamer basically operates in the mode specified at step S1 or step S3, irrespective of the type of the tape cassette loaded in the recording/reproducing unit 40.

At step S2, the controller verifies whether or not the tape cassette loaded on the recording/reproducing unit 40 is a D2 or D3 cassette. If the controller verifies that the tape cassette inserted is the D2 or D3 cassette, the program shifts to step S4 and, if otherwise, the program shifts to step S5.

At step S3, the controller 70 checks whether the mode specified by the host computer is the computer data D mode. If the result is YES, that is if the D mode is found to have been specified, the program shifts to step S6. If the result is NO, that is if the D mode is found not to have been specified, the program reverts to step s1.

At step S4, it is checked, based on the result of decision at step S2, whether or not the loaded tape cassette is the D2 cassette. If the result is YES, that is if the tape cassette is found to be the D2 cassette, the program shifts to step S7 to record the audio data on the D2 tape cassette.

If the result of check at step S4 is NO, that is if the tape cassette is the D3 cassette, the program shifts to step S8, in order to advise the host computer that the tape cassette is the D3 cassette and hence cannot be operated in the audio mode.

At step S5, it is checked whether or not the D1 or A cassette has been loaded on the recording/reproducing unit 40. If the result of check at step S5 is YES, that is if it is verified that the D1 or A cassette has been loaded on the recording/reproducing unit 40, the program shifts to step S7 to operate in the A mode. If the result is NO, that is if it is verified that the loaded tape cassette is not the D1 or A cassette, the program shifts to step S9 to notify to the host computer that, as a result of check at steps S2 and S5, the loaded tape cassette cannot be accepted by the present data streamer.

At step S6, the controller 70 checks, based on the result of step S3, indicating that the mode specified by the host computer is the computer data mode, whether or not the tape cassette loaded on the recording/reproducing unit 40 is the D1 or A cassette. If the result is YES, that is if the loaded tape cassette is the D1 or A cassette, the program shifts to step S10 to operate in the D1 mode. If the result is NO, that is if the loaded tape cassette is not the D1 nor A cassette, the program shifts to step S11 to verify whether or not the loaded tape cassette is the D2 cassette.

If the loaded tape cassette is found at step S11 to be the D2 cassette, the program shifts to step S12 to operate in the D2 mode. If the result of check at step S11 is NO, the program shifts to step S13.

At step S13, it is checked whether or not the loaded tape cassette is the D3 cassette. The program shifts to steps 14 to operate in the D3 mode. If the result is NO, that is if the loaded tape cassette is not the D3 tape cassette, the program shifts to step S15 to notify to the host computer that the loaded tape cassette is not acceptable.

Figure 6:
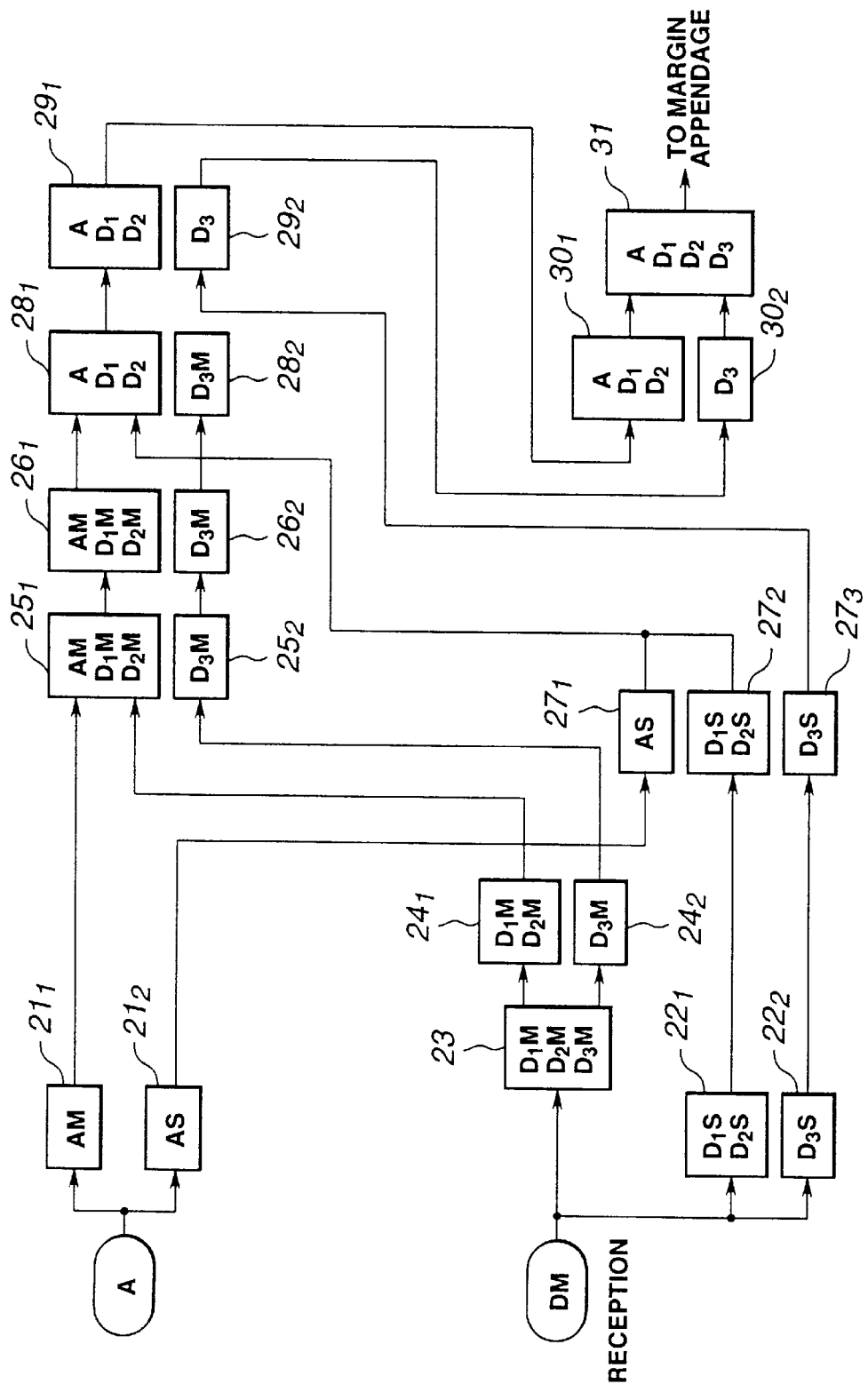
FIG. 6 illustrates the processing operation under modes A, D1, D2 or D3 of a signal processing unit of the recording system constituting a specified example of the data recording device.

The recording operation of the specified example of the data recording apparatus at steps S7, S10, S12 and S14 is explained in detail with reference to FIG. 6.

This specified example of the data recording apparatus operates in any of the A mode, D1 mode, D2 mode or the D3 mode. The recording operation is executed by the controller 70 switching among the operations of separation by the separation circuit 21, subcode generation by the subcode generating circuit 22, index appendage by the index appendage circuit 23, C3 encoding by the C3 encoder 24, subcode appendage by the subcode appendage circuit 27, interleaving by the interleaving circuit 25, C2 encoding by the C2 encoder 26, C1 encoding by the C1 encoder 28, block generation by the block generating circuit 29, 8/10 modulation by the 8/10 modulation circuit 30 and synchronization signal appendage by the synchronization signal appendage circuit 31, depending on the A mode, D1 mode, D2 mode or the D3 mode.

The controller 70 performs control so that, if the computer data entered via the interface controller 10 is of the above-mentioned D1 format or the above-mentioned D2 format, the processing by the subcode generating circuit 22 is the first subcode generating processing performed by a first subcode generating section $22_1$ and so that, if the computer data entered via the interface controller 10 is the above-mentioned D3 format, the processing by the subcode generating circuit 22 is the second subcode generating processing performed by the second subcode generating section $22_2$.

The controller 70 also performs control so that, if the computer data from the index appendage circuit 23 is of the D1 format or the D2 format, the C3 encoding by the C3 encoder fed with such computer data is the first C3 encoding executed by a C3 encoding section $24_1$, and so that, if the computer data is of the D3 format, the C3 encoding by the C3 encoder fed with such computer data is the second C3 encoding executed by the C3 encoding section $24_2$.

The controller 70 also performs control so that, if the input data, that is the audio main data AM from the separation circuit 21 and computer data from the C3 encoding circuit 24, is of the audio A format, D1 format or the D2 format, the interleaving processing in the interleaving circuit 25 fed with the above audio and computer data is the first interleaving processing executed by a first interleaving section $25_1$, and so that, if the above input data is of the D3 format, the interleaving processing in the interleaving circuit 25 fed with the above audio and computer data is the second interleaving executed by a second interleaving section $25_2$.

The controller 70 also performs control so that, if the input data is the data of the format A, format D1 or the Format D2 processed by the interleaving circuit 25 with first interleaving, the C2 encoding performed by the C2 encoder 26 is the first C2 encoding executed by a first C2 encoding section $26_1$, and so that, if the above input data is data of the D3 format, processed by the interleaving circuit 25 with the second interleaving, the interleaving processing in the interleaving circuit 25 is the second C2 encoding executed by a second encoding section $26_2$.

The controller 70 also performs control so that, if the input data is the data of the format A, format D1 or the Format D2 processed by the C2 encoder 26 with first C2 encoding, the C1 encoding performed by the C1 encoder 28 is the first C1 encoding executed by a first C encoding section $28_1$, and so that, if the above input data is data of the D3 format, encoded by the C2 encoder 26 with the second C2 encoding, the interleaving processing in the interleaving circuit 25 is the second C1 encoding executed by a second C1 encoding section $28_2$.

The controller 70 also performs control so that, if the input data is the subcode AS of data of the A format from the separation circuit 21, the subcode appending processing by the subcode appendage circuit 27 is the first subcode appendage processing executed by a first subcode appendage processing section $27_1$. The controller 70 also performs control so that, if the input data is the subcode $D_1S$ of the format D1 or the subcode $D_2S$ of the format D2 from the subcode generating circuit 22, the subcode appending processing by the subcode appendage circuit 27 is the second subcode appendage processing executed by a second subcode appendage processing section $27_2$ and so that, if the input data is the subcode $D_3S$ of the D3 format from the subcode generating circuit 22, the subcode appending processing by the subcode appendage circuit 27 is the third subcode appendage processing executed by a third subcode appendage processing section $27_3$.

The controller 70 also performs control so that, if the input data is the data of the A format, D1 format or the D2 format from the C1 encoder 28, the block generating processing by the block generating circuit 29 is the first block generating processing executed by a first block generating processor $29_1$ and so that, if the input data is the data of the format D3 format from the C1 encoder 28, the block generating processing by the block generating circuit 29 is the second block generating processing executed by a second block generating processor $29_2$.

The controller 70 also performs control so that, if the input data is the data of the A format, D1 format or the D2 format from the block generating circuit 29, the 8/10 modulation by 8/10 modulation circuit 30 is the first modulation executed by a first modulation section $30_1$ and so that, if the input data is the data of the format D3 format from the block generating circuit 29, the 8/10 modulation by 8/10 modulation circuit 30 is the second modulation executed by a second modulation section $30_2$.

The controller 70 controls the recording processing by the recording system signal processor 20, depending on the mode designation for audio or computer data sent from the outside via interface controller 10, and the type of the tape cassette loaded on the recording/reproducing unit 40, as shown by the flowchart of FIG. 5.

The above-described embodiment of the data recording device records data with the format of each generation corresponding to the type of the inserted tape cassette when the computer data mode is selected. If the audio mode is selected, and the DAT tape cassette is inserted, the recording device records the audio data.

If the audio mode is selected, and the DDS2 tape cassette is inserted, the audio data directly is recorded. On the other hand, if the audio mode is selected but the DD3 tape cassette is inserted, the effect that audio data cannot be recorded is advised to the host computer.

In the present specified embodiment of the data recording device, the rotational speed of the rotary drum 41 of the recording/reproducing unit 40, the average data transfer rate and the SCSI transfer rate via interface controller 10 is switched from mode to mode under control by the controller 70.

TABLE 2

| mode | A | D1 | D2 | D3 |
|---|---|---|---|---|
| rotational speed of drum (rpm) | 4251 | 4251 | 4251 | 4251 |
| average transfer rate (KBPS) | 408 | 389 | 389 | 1180 |
| SCSI transfer rate (MBPS) | 10 | 10 | 10 | 10 |

That is, for the A mode, the drum rpm is set to 4251, the average transfer rate is set to 408 kBPS and the SCSI transfer rate is 10 MBPS, whereas, for D1 and D2 modes, only the average transfer rate is changed to 389 kBPS. For the D3 mode, the average transfer rate is changed to 180 kBPS. This absorbs the difference in, for example, the track pitch or the line recording density during recording from one data format to another.

Figure 7:
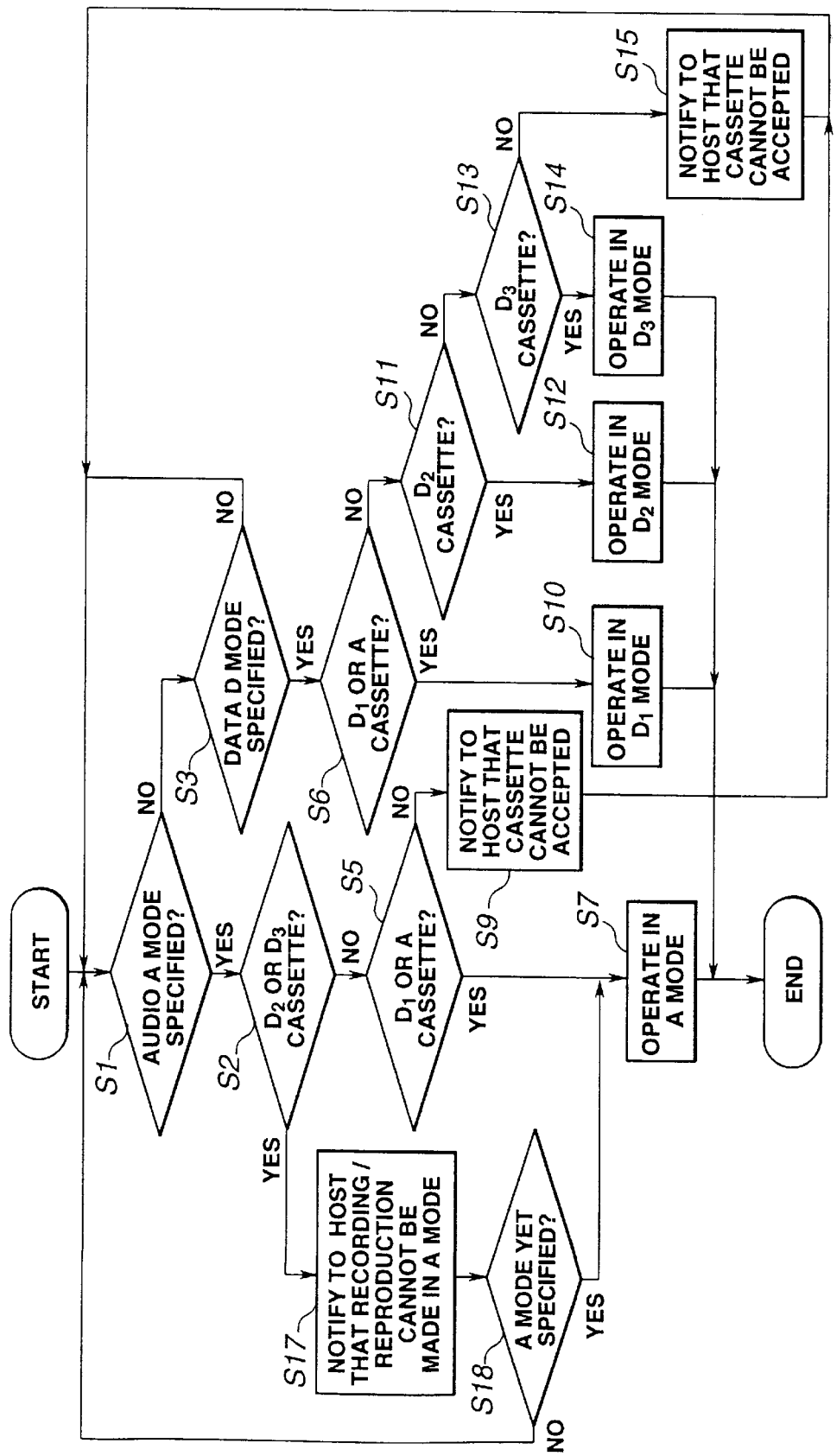
FIG. 7 is a flowchart for illustrating another exemplary operation of a specified example of the data recording apparatus constituting the data streamer.

In the present specified embodiment of the data recording device, audio data or computer data can be recorded in accordance with the flowchart shown in FIG. 7. The difference of the flowchart from that shown in FIG. 5 resides in elimination of steps S4 and S8 and addition of steps S17, S18.

That is, in the present specified embodiment, if it is found at step S2 in the flowchart of FIG. 7 that the tape cassette inserted is the D2 or D3 cassette, the program shifts to step S17 to advise the host computer of the effect that recording in the audio mode is not possible. If the audio mode is re-designated at step S18, the program shifts to step S7 to operate at the audio mode. That is, the recording device operates in the audio mode despite the fact that the tape cassette loaded on the recording/reproducing 40 is that for D2 or D3.

The above-described specified embodiment can record the audio data on all of the four sorts of the tape cassettes.

Returning to FIG. 4, the reproducing system signal processor 50, recording/reproducing unit 40, tracking controller 60 and the controller 70 make up a specified embodiment of the data reproducing device according to the present invention.

Figure 8:
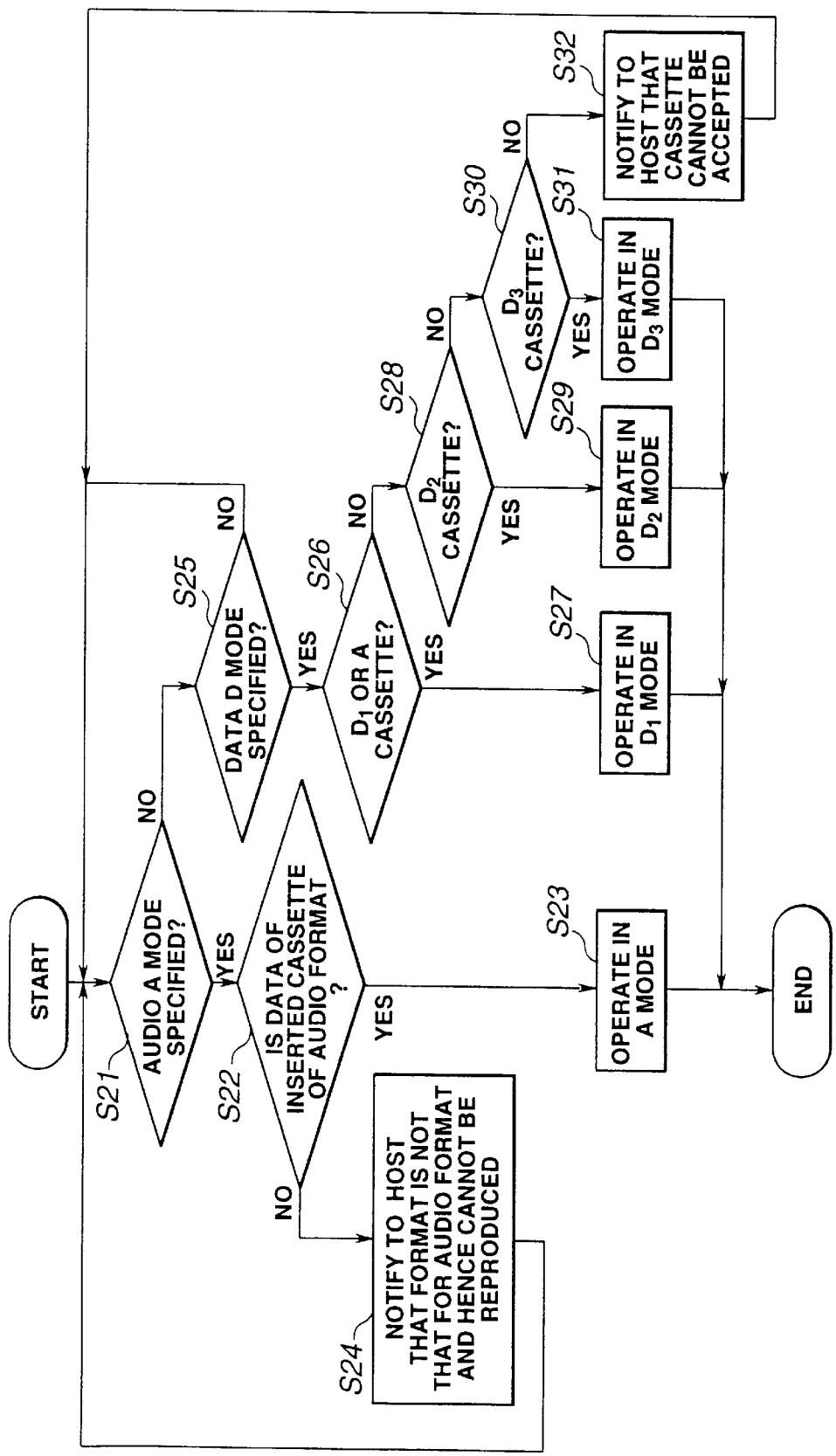
FIG. 8 is a flowchart for illustrating the operation of a specified example of a data reproducing apparatus constituting the data streamer.

The present specified embodiment reproduces the audio data or computer data in accordance with the flowchart shown in FIG. 8. First, at step S21, the controller 70 checks whether or not a command specifying the audio A mode has been supplied from the host computer. If the controller 70 finds that the A mode has been designated, the program shifts to step S22 and, if otherwise, the program shifts to step S25.

At step S22, it is checked whether or not the data recorded on the tape cassette loaded on the recording/reproducing unit 40 is of the audio format. If the result of check is YES, that is if the recorded data is of the audio format, the program shifts to step S23 to reproduce audio data from the loaded tape cassette.

Meanwhile, the format check is rendered possible by having, reference to the format ID in the main ID and/or data ID of sub-ID of the data recorded on the tape.

If the result of check at step S22 is NO, that is if the format is not the audio format, the program shifts to step S24 to advise the host computer of the fact that the data recorded on the loaded tape cassette is not of the audio format and hence cannot be reproduced.

At step S25, it is checked whether or not the mode designated by the host computer is the computer data D mode. If the result of the check is YES, that is if the D mode has been designated, the program shifts to step S26 and, if otherwise, the flow reverts to step S21.

At step S26, it is checked whether the cassette loaded is the D1 cassette or the A cassette, based on the result of check of step S25 indicating that the mode specified by the host computer is the computer data mode. If the result of the check is YES, that is if the cassette loaded is the D1 or A cassette, the program shifts to step S27 to operate under the D1 mode to reproduce computer data. Conversely, if the result of the check is NO, that is if the cassette loaded is not the D1 nor A cassette, the program shifts to step S28 to give decision whether or not the loaded cassette is the D2 cassette.

If the cassette loaded is found at step S28 to be a D2 cassette, the program shifts to step S29 to operate in the D2 mode to reproduce computer data. If the result of the check is NO, the program shifts to step S30.

At step S30, it is checked whether or not the cassette loaded on the recording/reproducing unit 40 is the D3 cassette. If the result of the check is YES, that is if the loaded cassette is the D3 cassette, the program shifts to step S31 to operate in the D3 mode to reproduce computer data. If the result of the check is NO, that is if the loaded cassette is found to be not for D3, the program shifts to step S32 to advise the host computer of the effect that the loaded cassette is not acceptable.

Figure 9:
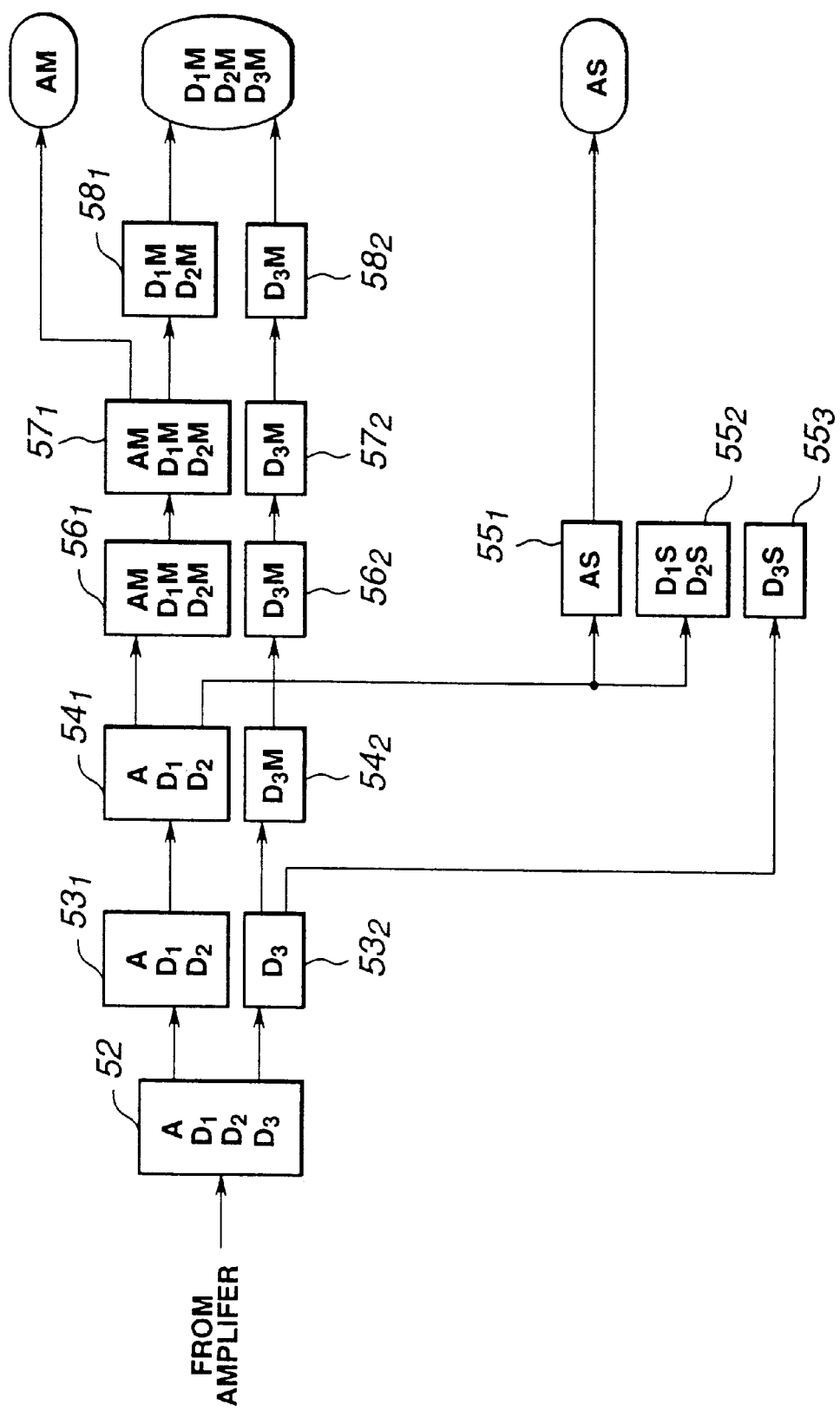
FIG. 9 illustrates the processing operation under modes A, D1, D2 or D3 of the signal processing unit of the reproducing system constituting the specified example of the data reproducing apparatus.

The recording operation of the specified embodiment of the data recording device at steps S23, S27, S29 and S31 is explained by referring to FIG. 9.

This specified embodiment of the data reproducing device is such a device which reproduces data in any one of the A mode, D1 mode, D2 mode or the D3 mode. The reproducing operation occurs by the controller 70 switching between detection of synchronization signals by the synchronization signal detection circuit 52, 10/8 demodulation by the 10/8 demodulation circuit 53, C1 decoding by the C1 decoder 54, C2 decoding by the C2 decoder 56, subcode decoding by the subcode decoding circuit 55, deinterleaving by the deinterleaving circuit 57, C3 decoding by the C3 decoder 58 and index decoding by the index decoding circuit 59 in association with the A1 mode, D1 mode, D2 mode or the D3e mode.

If the data fed via the synchronization signal detection circuit 52 is the data of A1, D1 or D2 format, the controller 70 manages control so that demodulation by the 10/8 demodulation by the 10/8 demodulation circuit 53 will be the first demodulation performed by a first demodulation unit $53_1$. If the data fed via the synchronization signal detection circuit 52 is the data of the D3 format, the controller 70 manages control so that demodulation by the 10/8 demodulation by the 10/8 demodulation circuit 53 will be the second demodulation performed by a second demodulation unit $53_2$.

If the input data is the data of the A, D1 or D2 format processed by first demodulation by the 10/8 demodulation circuit 53, the controller 70 manages control so that control so that the C1 decoding by the C1 decoder 54 will be the first C1 decoding performed by the first C1 decoding processor $54_1$. If the input data is the data of the format D3 processed with the second demodulation, the controller 70 manages control so that the C1 decoding by the C1 decoder 54 will be the second C1 decoding performed by the second C1 decoding processor $54_2$.

If the input data is the data of the A, D1 or D2 format processed by first demodulation by the C1 decoder 54, the controller 70 manages control so that the C2 decoding by the C2 decoder 56 will be the first C2 decoding performed by the first C2 decoding processor $56_1$. If the input data is the data of the format D3 processed with the second C1 decoding, the controller 70 manages control so that the C2 decoding by the C2 decoder 56 will be the second C2 decoding performed by the second C2 decoding processor $56_2$.

If the input data is the data of the A, D1 or D2 format processed by first C2 decoding by the C2 decoder 56, the controller 70 manages control so that the interleaving by the deinterleaving circuit 57 will be the first deinterleaving performed by the first C2 deinterleaving processor $57_1$. If the input data is the data of the format D3 processed with the second C2 decoding, the controller 70 manages control so that deinterleaving by the deinterleaving circuit 57 will be the second deinterleaving performed by the second deinterleaving processor $57_2$.

If the input data is the data of the A, D1 or D2 format processed by first deinterleaving by the deinterleaving circuit 57, the controller 70 manages control so that C3 decoding by the C3 decoder 58 will be the first C3 decoding performed by the first C3 decoding processor $58_1$. If the input data is the data of the format D3 processed with the second C2 deinterleaving, the controller 70 manages control so that C3 decoding by the c3 decoder 58 will be the second C3 decoding performed by the second C3 decoding processor $58_2$.

If the input data is the data of the A format processed by subcode decoding by the C1 decoder 54, the controller 70 manages control so that subcode decoding by the subcode decoding circuit 55 will be the first subcode decoding performed by the first subcode decoding processor $55_1$. If the input data is the data of the format D1 or D2, the controller 70 manages control so that subcode decoding by the subcode decoding circuit 55 will be the second subcode decoding performed by the second subcode decoding processor $55_2$ and, if the input data is the data of the format D3, the controller 70 manages control so that subcode decoding by the subcode decoding circuit 55 will be the third subcode decoding performed by the third subcode decoding processor $55_3$.

The controller 70 controls the above-mentioned processing of the reproducing system signal processor 50 depending on the mode designation of the audio or computer data supplied from outside via interface controller 10 and the format of data recorded on the tape cassette loaded on the recording/reproducing unit 40, as shown in the flowchart of FIG. 8.

If the computer data mode is designated, the above-described specified embodiment of the data reproducing device reproduces data with the format of each generation depending on the type of the loaded tape cassette. If the audio mode is selected and the tape cassette inserted in the tape cassette for DAT, the audio data is reproduced.

If the audio mode is selected but the tape cassette of the DDS2 or DDS3 is inserted, the audio data is reproduced only if the format of the data recorded on the tape is the audio format. If the data recorded on the tape is the computer data format, the effect that the data cannot be reproduced is transmitted to the lost computer.

In the present specified embodiment of the data recording device, the rotational speed of the rotary drum 41 of the recording/reproducing unit 40, average data transfer rate and the SCSI transfer rate via the interface controller 10 are changed over from one mode to another, under control by the controller 70, as shown in the above Table 2.

The data streamer of the above-described embodiment, made up of the specified embodiment of the data recording device and the specified embodiment of the data reproducing device, can record/reproduce data of the four formats of A, D1, D2 and D3, that is audio data and computer D1, D2 and D3 data.

What is claimed is:

1. A data recording apparatus for recording one of audio data and computer data to an azimuth track on a magnetic tape by a rotary head comprising:

an interface controller;

recording system signal processing means for performing recording system signal processing on one of the audio data and the computer data entered via the interface controller; and control means for controlling the recording system signal processing means where said control means is responsive to four data formats, including an audio data format for said audio data, a first computer data format comprised of the audio data format with added error correction provisions in each track width direction in terms of a defined number of tracks, a second computer data format having a track pitch prescribed to be narrower than in the first computer data format, and a third computer data format having a line recording density higher than in the second computer data format.

2. The data recording apparatus according to claim 1, wherein said recording system signal processing means includes:

separation means for separating audio main data and audio sub-data of from the audio data, subcode generating means for generating sub-codes of the computer data, index appendage means for appending the index information to the computer data, C3 encoding means for appending the a C3 error correction code to a data string in the track width direction in terms of a defined number of tracks of the computer data having the appended index information, interleaving means for interleaving computer data having an appended C3 error correction code and separated audio main data, C2 encoding means for appending a C2 error correction code to a data string in the track direction of the deinterleaved computer data or audio main data, subcode appendage means for appending the separated audio sub-code to the audio main data and for appending the sub-code of the computer data to the computer data, C1 encoding means for appending a C1 error correction code to each defined block unit of audio main data having appended audio sub-data and computer data having appended computer data sub-codes, block-forming means for blocking one of the audio data and the computer data having the C1 error correction code appended thereto and for appending the sub-codes for said computer data from said subcode appendage means to the computer main data from the C1 encoding means and for blocking resulting data, modulating means for modulating one of the blocked audio data and the computer data, and synchronization signal appendage means for appending synchronization signals to a modulated output of the modulating means.

3. The data recording apparatus according to claim 2 wherein said subcode generating means executes one of first subcode generating processing and second subcode generating processing when the computer data input thereto is the first or second computer data format or when the computer data input thereto is the third computer data format, respectively.

4. The data recording apparatus according to claim 2 wherein said C3 encoding means executes one of first C3 encoding and second C3 encoding when the computer data input thereto is of the first or second computer data format or when the computer data input thereto is of the third computer data format, respectively.

5. The data recording apparatus according to claim 2 wherein said interleaving means executes first interleaving when data input thereto is of the audio format, first computer data format or the second computer data format and executes second interleaving when data input thereto is of the third computer data format.

6. The data recording apparatus according to claim 5 wherein said C2 encoding means executes first C2 encoding when data input thereto is data of the audio format, first computer data format or the second computer data format processed with said first interleaving and executes second C2 encoding when data input thereto is data of the third computer data format processed with said second interleaving.

7. The data recording apparatus according to claim 6 wherein said C1 encoding means executes first C1 encoding when data input thereto is data of the audio format, first computer data format or the second computer data format processed with said first C2 encoding and executes second C1 encoding when data input thereto is data of the third computer data format processed with said second C2 encoding.

8. The data recording apparatus according to claim 7 wherein said block forming means executes first blocking when data input thereto is data of the audio data format, first computer data format or the second computer data format processed with said first C1 encoding and executes second blocking when data input thereto is data of the third computer data format processed with said second C1 encoding.

9. The data recording apparatus according to claim 2 wherein said subcode appendage means executes first subcode appendage processing when data input thereto is the subcode of data of the audio format from said separation means, and executes second appendage processing when data input thereto is subcode of the third computer data format from said subcode generating means.

10. The data recording apparatus according to claim 2 wherein said modulation means executes first modulation when data input thereto is data of the audio data format, first computer data format or the second computer data format and executes second modulation when data input thereto is data of the third computer data format.

11. The data recording apparatus according to claim 1 wherein said control means controls said recording system signal processing means depending on a mode designation command designating one of audio data and computer data externally supplied via the interface controller and depending on a kind of magnetic tape loaded on recording means provided with the rotary head and being adapted to record data on the magnetic tape.

12. The data recording apparatus according to claim 11 wherein said control means records said audio data on said magnetic tape when the audio mode is specified by the mode designating command and when the kind of the magnetic tape is for said second computer data format.

13. The data recording apparatus according to claim 11 wherein said control means provides an indication to a user that audio data cannot be recorded on said magnetic tape when the audio mode is specified by the mode designating command and when the kind of the magnetic tape is for said third computer data format.

14. The data recording apparatus according to claim 11 wherein said control means causes the data of the audio format to be recorded on the magnetic tape subject to a second externally supplied command when the audio mode is specified by the mode designating command and if when the kind of the magnetic tape is for said second or third computer data format.

15. A data recording method for recording one of audio data and computer data to an azimuth track on a magnetic tape by a rotary head, comprising:
inputting one of said audio data and said computer data via an interface controller;
controlling a recording system signal processing where said controlling is responsive to four data formats including an audio data format for said audio data, a first computer data format comprised of the audio data format with added error correction provisions in the track width direction in terms of a defined number of tracks as a unit, a second computer data format having a track pitch prescribed to be narrower in track pitch than in the first computer data format, and a third computer data format having a line recording density higher than in the second computer data format; and
recording one of said audio data and said computer data processed with the recording system signal processing on said magnetic tape.

16. The data recording method according to claim 15 wherein said step of controlling includes controlling the recording system signal processing depending on a mode designating command designating audio or computer data supplied via the interface controller and depending on a kind of the magnetic tape.

17. A data reproducing apparatus for reproducing one of audio data and computer data recorded on an azimuth track on a magnetic tape by a rotary head, comprising:
reproducing means for reading out one of said audio data and said computer data recorded on the magnetic tape using a rotary head;
reproducing system signal processing means for processing said audio data or said computer data from said reproducing means with reproducing system signal processing; and
control means for controlling said reproducing system signal processing means in accordance with four kinds of data format, including an audio data format for said audio data, a first computer data format comprised of the audio data format with added error correction provisions in each track width direction in terms of a defined number of tracks, a second computer data format having a track pitch prescribed to be narrower than in that of the first computer data format, and a third computer data format having a line recording density higher than in the second computer data format.

18. The data reproducing apparatus according to claim 17 wherein said reproducing system signal processing means includes;
synchronization signal detection means for detecting synchronization signals from said audio data or said computer data read out from said reproducing means;
demodulating means for demodulating said audio data or said computer data using detected synchronization signals from said synchronization signal detection means;
C1 decoding means for processing the demodulated audio data or computer data from said demodulation means with C1 error correction using the C1 error correction code;
C2 decoding means for processing said audio data or said computer data from said C1 decoding means with C2 error correction using the C2 error correction code;
deinterleaving means for deinterleaving said audio data or said computer data from said C2 decoding means;
C3 decoding means for processing the deinterleaved computer data with C3 error correction; and
subcode decoding means for decoding subcodes from said audio data or said computer data from said C1 decoding means and said computer data from said demodulating means.

19. The data reproducing apparatus according to claim 18 wherein said demodulating means processes data input thereto with first demodulation when the data input thereto is data of the audio format, the first computer data format or the second computer data format and with second demodulation when the data input thereto is data of the third computer data format.

20. The data reproducing apparatus according to claim 19 wherein said C1 decoding means processes input data with first C1 decoding when data input thereto is data of the audio format, the first computer data format or the second computer data format processed with said first demodulation and with second C1 decoding when data input thereto is data of the third computer data format processed with said second demodulation.

21. The data reproducing apparatus according to claim 20 wherein said C2 decoding means processes input data with first C2 decoding when data input thereto is data of the audio format, the first computer data format or the second computer data format processed with said first C1 decoding and with first C2 decoding when data input thereto is data of the third computer data format processed with said second C1 decoding.

22. The data reproducing apparatus according to claim 21 wherein said deinterlaving means processes data input thereto with first deinterleaving when the data is data of the audio format, the first computer data format or the second computer data format processed with said first C2 decoding and with second deinterleaving when data is data of the third computer data format processed with said second C2 decoding.

23. The data reproducing apparatus according to claim 22 wherein said C3 decoding means processes data input thereto with first C3 decoding when the data is data of the first computer data format or the second computer data format processed with said first deinterleaving and with second C3 decoding when the data is data of the third computer data format processed with said second deinterleaving.

24. The data reproducing apparatus according to claim 18 wherein said subcode decoding means processes data input thereto with first subcode decoding when the data is data the audio format, processes data input thereto with second subcode decoding when the data is data of the first computer data format or the second computer data format, and processes data input thereto with third subcode decoding when the data is data of the third computer data format.

25. The data reproducing apparatus according to claim 18 wherein said control means controls the reproducing system signal processing depending on a mode designating command designating said audio data or said computer data supplied via said interface controller and depending on the format of data recorded on the magnetic tape loaded on said reproducing apparatus.

26. The data reproducing apparatus according to claim 25 wherein said control means reproduces data of the audio format from the magnetic tape when the audio mode is specified by an externally supplied mode designating command and when the format of data recorded on the magnetic tape is the audio format.

27. The data reproducing apparatus according to claim 25 wherein when the audio mode is designated by the mode designating command and the format of data recorded on the tape-shaped recording medium is the computer data format, said control means indicates to a user that the computer data cannot be reproduced.

28. A data reproducing method for reproducing one of audio data and computer data recorded on an azimuth track on a magnetic tape by a rotary head, comprising:

reproducing one of said audio data and said computer data recorded on the magnetic tape by reproducing means;

controlling a reproducing system signal processing for reproduced data in accordance with four kinds of data format, including an audio data format for said audio data, a first computer data format comprised of the audio data format with added error correction provisions in each track width direction in terms of a defined number of tracks, a second computer data format having a track pitch prescribed to be narrower than a track pitch of the first computer data format, and a third computer data format having a line recording density higher than in the second computer data format; and outputting one of said audio data and said computer data processed with said reproducing system signal processing via an interface controller.

29. The data reproducing method according to claim 28 wherein the reproducing system signal processing is controlled in accordance with a mode designation command of said audio data or said computer data externally supplied via said interface controller and the format of data recorded on the magnetic tape.

* * * * *